United States Patent
Hines

(10) Patent No.: US 10,219,495 B2
(45) Date of Patent: Mar. 5, 2019

(54) SYSTEM AND METHOD FOR ATTRACTING FISH USING SENSORY CHARACTERISTICS

(71) Applicant: Mitchell Hines, Robstown, TX (US)

(72) Inventor: Mitchell Hines, Robstown, TX (US)

( * ) Notice: Subject to any disclaimer, the term of this patent is extended or adjusted under 35 U.S.C. 154(b) by 0 days.

(21) Appl. No.: 15/958,845

(22) Filed: Apr. 20, 2018

(65) Prior Publication Data
US 2018/0235196 A1   Aug. 23, 2018

(51) Int. Cl.
| | |
|---|---|
| *A01K 85/00* | (2006.01) |
| *A01K 97/00* | (2006.01) |
| *A01K 85/01* | (2006.01) |
| *A01K 97/02* | (2006.01) |
| *A01K 97/04* | (2006.01) |

(52) U.S. Cl.
CPC .............. *A01K 85/00* (2013.01); *A01K 85/01* (2013.01); *A01K 97/00* (2013.01); *A01K 97/02* (2013.01); *A01K 97/04* (2013.01); *A01K 97/045* (2013.01)

(58) Field of Classification Search
CPC ...... A01K 85/00; A01K 85/005; A01K 85/01; A01K 85/12; A01K 85/10; A01K 97/045; A01K 97/02; A01K 97/04; A01K 97/05; A01K 75/04; A01K 93/00; A01K 97/00; A01K 69/00; A01K 99/00
See application file for complete search history.

(56) References Cited

U.S. PATENT DOCUMENTS

| | | | | |
|---|---|---|---|---|
| 1,986,441 A | * | 1/1935 | Koepke | A01K 93/00 43/44.91 |
| 2,186,281 A | * | 1/1940 | Cochran | A01K 93/00 43/17 |
| 2,724,206 A | * | 11/1955 | Miller | A01K 93/00 43/42.31 |
| 3,967,407 A | * | 7/1976 | Halbasch | A01K 93/00 43/44.9 |
| 4,475,301 A | * | 10/1984 | Wortham | A01K 97/04 43/17.5 |
| 4,748,765 A | * | 6/1988 | Martin | A01K 97/20 43/55 |
| 4,757,631 A | * | 7/1988 | Anson-Smith | A01K 79/02 43/17.5 |
| 5,319,875 A | * | 6/1994 | Brandolino | A01K 83/06 43/41 |

(Continued)

FOREIGN PATENT DOCUMENTS

GB   2462463 A   *   2/2010   ........... A01K 97/02

*Primary Examiner* — Kathleen I Alker
(74) *Attorney, Agent, or Firm* — Barry Choobin; Patent 360

(57) ABSTRACT

A fish calling device for attracting predatory fishes by mimicking all sensory characteristics of a prey including appearance, sound and smell is disclosed. The device is configured to spray water into a waterbody around the device in a circular or a semi-circular pattern, thereby mimicking the appearance of a group of bait fishes. The water is sprayed to create the sound of a bait fish trying to escape from the predatory fishes when sprayed onto the waterbody. A scent bag is attached to the sprayer for dispersing/dispensing a smell through the water sprayer thereby mimicking the smell of a bait fish. Thus the device activates three senses of the predatory fishes including sight, hearing and smell for attracting them while fishing/competition.

11 Claims, 2 Drawing Sheets

(56) References Cited

U.S. PATENT DOCUMENTS

| | | | | |
|---|---|---|---|---|
| 5,497,581 | A * | 3/1996 | Williams | A01K 85/01 43/42.31 |
| 5,950,345 | A * | 9/1999 | Kilander | A01K 85/00 43/2 |
| 8,776,427 | B1 * | 7/2014 | Lening | A01K 97/02 416/235 |
| 2007/0068063 | A1 * | 3/2007 | Simpson | A01K 63/02 43/57 |
| 2012/0073183 | A1 * | 3/2012 | Kissee | A01K 93/00 43/43.14 |
| 2016/0345564 | A1 * | 12/2016 | Nicosia | A01K 93/00 |
| 2017/0245485 | A1 * | 8/2017 | Barnett | A01K 93/00 |

\* cited by examiner

SYSTEM AND METHOD FOR ATTRACTING FISH USING SENSORY CHARACTERISTICS

BACKGROUND

Technical Field

The embodiments herein are generally related to a fishing equipment. The embodiments herein are particularly related to a device for attracting predatory fishes during fishing activities and competition/game. The embodiments herein are more particularly related to a system and method for attracting and catching predatory fishes by activating the sensory characteristics of the predatory fish.

Description of the Related Art

Fishing has been practiced since centuries for livelihood and as a competition. The success in fishing depends on an equipment and tactics used by an angler/fisherman. Hence there has been a lot of innovations in the equipments used for fishing. One of the most common equipment for attracting predatory fishes is a fishing lure/bait that stimulates appearance and actions of a prey or fish bait. The fishing lure/bait is attached at the end of a fishing line to attract fishes to the fishing line to trap and catch the predatory fishes. The fishing lure/bait mimics physical or organic characteristics of the prey including movement, vibration, flash and color.

In the past, live baits have been used to attract predatory fishes. Live baits includes shads, minnows, earthworms and the like. Fishing using live baits generally takes a long time. Further, the use of live baits become costly and unpleasant to work with. Nowadays, artificial fishing baits/fishing lures are commonly used by anglers for attracting predatory fishes. The artificial fishing baits/fishing lures are of different types based on the physical or organic characteristics stimulated by them. The artificial fishing baits resembles a prey for the fishes due to the physical or organic characteristics exhibited.

The different types of artificial fishing baits includes jigs, spinnerbaits, swimbaits and the like. The jigs are weighted hooks with a lead head and a sharp tip that exhibits up and down movements when the jigs are drifted underwater. Further the spinnerbaits generally comprise a piece of wire loaded with a hook and flashy spinners to exhibit the appearance of a prey. Swimbaits are soft plastic lures with a tail that resembles an actual fish swimming underwater. Thus the artificial fishing baits generally mimic the appearance of a prey. However, the artificial fishing baits/fishing lures are small in size. Therefore, it becomes hard for the predatory fishes to spot them in cloudy water as the visibility in the cloudy water is less.

Another equipment for attracting predatory fishes are bait bags. The bait bags are used for fishing in waterbodies like lake, river and ocean. The bait bags include bags that are used to load and keep soft and hard-to-hook baits like livers, doughs, cheese baits, chumps, and your special mixes on the hook. The bait bags are generally tied to the boat to put out a scent to attract predatory fishes towards the boat. However, the bait bags does not create any appearance, sound or prey pattern, thereby making it less effective.

Hence, there is a need for a fish calling device capable of attracting predatory fishes by mimicking all characteristics including appearance, sound and smell of a natural prey. There is also a need for a fish calling device capable of activating senses of the predatory fishes including sight, hearing and smell. Further, there is a need for a fish calling device capable of being used from both in-shore and off-shore. Yet there is a need for a fishing equipment or a system and method for attracting and catching fishes during fishing or competition or game using or mimicking sensory characteristics of the fishes.

The above-mentioned shortcomings, disadvantages, and problems are addressed herein and which will be understood by reading and studying the following specification.

Objectives of the Embodiments Herein

The primary object of the embodiments herein is to provide a fish calling device capable of attracting predatory fishes by mimicking appearance, sound and smell of a natural prey.

Another object of the embodiments herein is to provide a fish calling device capable of activating all three senses including sight (vision), hearing (audition) and smell (olfaction) for attracting predatory fishes.

Yet another object of the embodiments herein is to provide a fish calling device capable spaying water into a waterbody in a pattern mimicking an appearance of a large cluster of bait fishes for attracting the predatory fishes.

Yet another object of the embodiments herein is to provide a fish calling device capable spaying water into a waterbody creating sound like bait fish trying to get away from predatory fishes.

Yet another object of the embodiments herein is to provide a fish calling device capable of spaying scented water into a waterbody creating smell of a bait fish.

Yet another object of the embodiments herein is to provide a fish calling device capable of spraying water in a circular pattern by moving in back and forth or in a circle.

Yet another object of the embodiments herein is to provide a fish calling device capable of spraying water in a circular pattern that complies with bait fish balling up in a ball formation.

Yet another object of the embodiments herein is to provide a fish calling device capable of spraying water in a semi-circular pattern that complies with small bait fishes feeding on top of a waterbody Yet another object of the embodiments herein is to provide a fish calling device that is used in shore for attracting predatory fishes by spraying water into a waterbody.

Yet another object of the embodiments herein is to provide a fish calling device that floats on a waterbody for attracting predatory fishes by spraying water into the waterbody.

Yet another object of the embodiments herein is to provide a fish calling device that enables fishing from any one of a boat, a dock and a shoreline.

Yet another object of the embodiments herein is to provide a fishing equipment or a system and method for attracting and catching fishes during fishing or competition or game using or mimicking sensory characteristics including visual, audition and olfaction of the fishes.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The embodiments herein provide a fishing equipment for attracting predatory fishes by mimicking all the sensory characteristics of a prey including appearance, sound and smell. According to an embodiment herein, the fishing equipment is a fish calling device capable of spraying water into a waterbody around the fish calling device. The water is sprayed from the fish calling device in a circular pattern or semi-circular pattern, thereby mimicking the appearance of bait fishes. Further, the water creates a giggling sound of the bait fishes trying to escape from the predatory fishes, when water is sprayed into the waterbody. Furthermore, the fish calling device comprises a scent bag attached to the sprayer for dispersing a smell in the waterbody, thereby mimicking the smell of a bait fish. Thus the fish calling device activates the three senses or sensory characteristics of the predatory fishes including sight/vision, hearing/audition and smell/olfaction for attracting them while fishing/competition.

According to an embodiment herein, a fish calling device is disclosed. The fish calling device comprises a sprayer, a pump, a pipe, a float, a retainer ring and a base. The sprayer is configured for spraying water to a waterbody around the fish calling device for attracting predatory fishes during fishing by mimicking the sensory characteristics of bait fishes including an appearance, a sound and a smell. The sprayer comprises a nozzle for spraying the water into the waterbody. The sprayer rotates in a clockwise direction while spraying water into the waterbody for creating a pattern. The pump is configured for pushing water to the sprayer. The pump comprises a strainer for filtering the water pushed to the sprayer. The pipe is configured for transferring water from the pump to the sprayer, and wherein one end of the pipe is connected to the pump while the sprayer is connected to the other end of the pipe. The float is configured for enabling the fish calling device to float on the waterbody when used in off-shore. The float is attachable and detachable (removably attached) to the fish calling device. The retainer ring is configured for attaching the float to the fish calling device. The retainer ring is placed in a middle of the pipe along the length or longitudinal direction. The base is configured for attaching the fish calling device to a dock or a shoreline, when the fish calling device is used in-shore. The base comprises the pump attached on top of the base.

According to an embodiment herein, the sprayer is configured to spray water to the waterbody in the pattern to comply with the appearance of a large cluster of bait fishes.

According to an embodiment herein, the sprayer is configured to spray water into the waterbody thereby creating a sound mimicking the sound of bait fishes escaping from the predatory fish.

According to an embodiment herein, the fish calling device further comprises a scent bag attached by suction to the sprayer for dispersing/dispensing the smell of bait fishes when spraying water into the waterbody.

According to an embodiment herein, the fish calling device is configured to activate the three senses/sensory characteristics including sight/vision, hearing/audition and smell/olfaction characteristics of the predatory fishes.

According to an embodiment herein, the pump is operated/configured to push water to the sprayer by pumping water from the waterbody when used in off-shore.

According to an embodiment herein, the pump is operated/configured to push water to the sprayer by pumping water from a secondary water source when used in-shore.

According to an embodiment herein, the fish calling device is configured to spray water in a circular pattern by moving in back and forth direction or in a circle when used in off-shore.

According to an embodiment herein, the fish calling device is configured to spray water in a semi-circular format when used in-shore.

According to an embodiment herein, the sprayer is configured to spray the water in a circular pattern to comply with bait fishes balling up to form a bait ball.

According to an embodiment herein, the sprayer is configured to spray the water mimicking the appearance, sound and smell of the bait fish for leading the predatory fishes to enter into a feeding frenzy.

According to an embodiment herein, the float is configured to enable the fish calling device to float on the waterbody by itself.

According to an embodiment herein, the float is configured to enable the fish calling device to draw predatory fishes from deep to feed on bait fishes.

According to an embodiment herein, the fish calling device further comprises a battery for supplying required power.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those skilled in the art from the following description of the preferred embodiment herein and the accompanying drawings in which.

Figure 1:
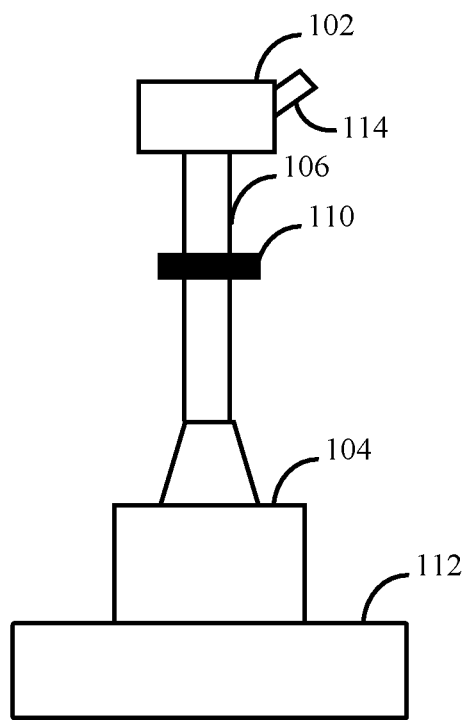
FIG. 1 illustrates a side view of a fish calling device, according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a fishing equipment for attracting predatory fishes by mimicking all the sensory characteristics of a prey including appearance, sound and smell. According to an embodiment herein, the fishing equipment is a fish calling device capable of spraying water into a waterbody around the fish calling device. The water is sprayed from the fish calling device in a circular pattern or semi-circular pattern, thereby mimicking the appearance of bait fishes. Further, the water creates a giggling sound of the bait fishes trying to escape from the predatory fishes, when water is sprayed into the waterbody. Furthermore, the fish calling device comprises a scent bag attached to the sprayer for dispersing a smell in the waterbody, thereby mimicking the smell of a bait fish. Thus the fish calling device activates the three senses or sensory characteristics of the predatory fishes including sight/vision, hearing/audition and smell/olfaction for attracting them while fishing/competition.

According to an embodiment herein, a fish calling device is disclosed. The fish calling device comprises a sprayer, a pump, a pipe, a float, a retainer ring and a base. The sprayer is configured for spraying water to a waterbody around the fish calling device for attracting predatory fishes during fishing by mimicking the sensory characteristics of bait fishes including an appearance, a sound and a smell. The sprayer comprises a nozzle for spraying the water into the waterbody. The sprayer rotates in a clockwise direction while spraying water into the waterbody for creating a pattern. The pump is configured for pushing water to the sprayer. The pump comprises a strainer for filtering the water pushed to the sprayer. The pipe is configured for transferring water from the pump to the sprayer, and wherein one end of the pipe is connected to the pump while the sprayer is connected to the other end of the pipe. The float is configured for enabling the fish calling device to float on the waterbody when used in off-shore. The float is attachable and detachable (removably attached) to the fish calling device. The retainer ring is configured for attaching the float to the fish calling device. The retainer ring is placed in a middle of the pipe along the length or longitudinal direction. The base is configured for attaching the fish calling device to a dock or a shoreline, when the fish calling device is used in-shore. The base comprises the pump attached on top of the base.

According to an embodiment herein, the sprayer is configured to spray water to the waterbody in the pattern to comply with the appearance of a large cluster of bait fishes.

According to an embodiment herein, the sprayer is configured to spray water into the waterbody thereby creating a sound mimicking the sound of bait fishes escaping from the predatory fish.

According to an embodiment herein, the fish calling device further comprises a scent bag attached by suction to the sprayer for dispersing/dispensing the smell of bait fishes when spraying water into the waterbody.

According to an embodiment herein, the fish calling device is configured to activate the three senses/sensory characteristics including sight/vision, hearing/audition and smell/olfaction characteristics of the predatory fishes.

According to an embodiment herein, the pump is operated/configured to push water to the sprayer by pumping water from the waterbody when used in off-shore.

According to an embodiment herein, the pump is operated/configured to push water to the sprayer by pumping water from a secondary water source when used in-shore.

According to an embodiment herein, the fish calling device is configured to spray water in a circular pattern by moving in back and forth direction or in a circle when used in off-shore.

According to an embodiment herein, the fish calling device is configured to spray water in a semi-circular format when used in-shore.

According to an embodiment herein, the sprayer is configured to spray the water in a circular pattern to comply with bait fishes balling up to form a bait ball.

According to an embodiment herein, the sprayer is configured to spray the water mimicking the appearance, sound and smell of the bait fish for leading the predatory fishes to enter into a feeding frenzy.

According to an embodiment herein, the float is configured to enable the fish calling device to float on the waterbody by itself.

According to an embodiment herein, the float is configured to enable the fish calling device to draw predatory fishes from deep to feed on bait fishes.

According to an embodiment herein, the fish calling device further comprises a battery for supplying required power.

Figure 2:
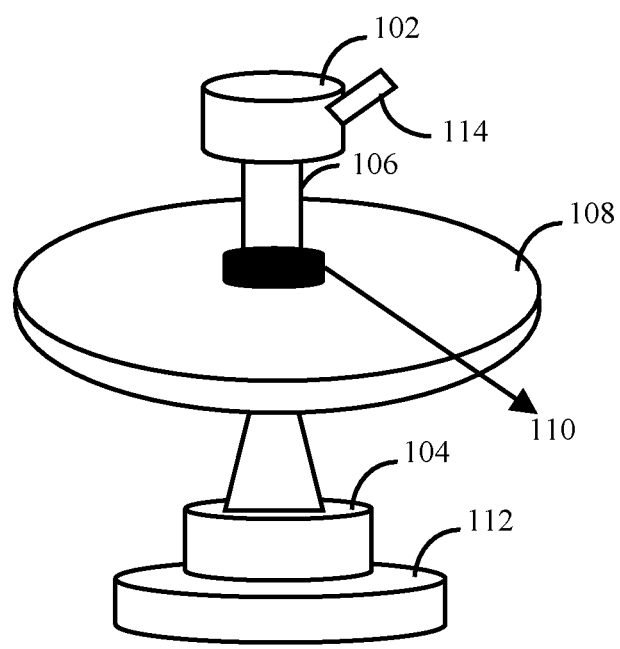
FIG. 2 illustrates a top side perspective view of a fish calling device with a float attached to the fish calling device, according to one embodiment herein.

FIG. 1 illustrates a side view of a fish calling device, according to one embodiment herein. FIG. 2 illustrates a top side perspective view of a fish calling device with a float attached, according to one embodiment herein. With respect to FIG. 1 and FIG. 2, the working of the fish calling device is explained. The fish calling device comprises a sprayer 102, a pump 104, a pipe 106, a float 108, a retainer ring 110, and a base 112. The fish calling device is used for spraying water to a waterbody while fishing. The water sprayed into the waterbody from the fish calling device mimics an appearance, a sound and a smell of a bait fish, thereby attracting predatory fishes to nearby area for fishing. The fish calling device activates the senses of sight, hearing and smell of the predatory fishes. The fish calling device is used for fishing in different types of waterbodies including but not limited to lake, river and ocean. The fish calling device is used for both off shore and in-shore fishing activities.

The fish calling device when used in-shore is fixed to the side of a deck, a boat, or a shoreline. The fish calling device is fixed using the base 112. Further, the fish calling device is used off-shore by attaching a float 108 to the fish calling device. The float 108 is shown in FIG. 2. The float 108 is fastened to the fish calling device using a retainer ring 110. The float 108 is attachable and detachable to the fish calling device. The float 108 enables the fish calling device to float on the waterbody by itself. The fish calling device floating on the waterbody makes a good haven for bait fishes, thereby attracting predatory fishes to the area. The fish calling device floating on the waterbody enables to attract the predatory fishes from deep to feed on bait fishes.

While using at both off-shore and in-shore, the fish calling device is configured to spray water into the waterbody. The fish calling device comprises a sprayer 102 configured for spraying water into the waterbody. The sprayer 102 comprises a nozzle 114 through which the water is sprayed into the waterbody. The sprayer 102 rotates in one of a clockwise or an anticlockwise direction while spraying water into the waterbody. Further the fish calling device is configured to move in a back and forth direction or in a circle while spraying the water into the waterbody. The movement of the fish calling device in the back and forth direction or in the circle creates a round circular pattern of water sprayed into the waterbody when used off-shore. The fish calling devices creates a semi-circular pattern of water sprayed into the waterbody when used in-shore. The semi-circular pattern is created at a distance of 5-30 feet from the position of fish calling device.

The semi-circular pattern formed in the waterbody when used in-shore resembles the appearance of a cluster of small bait fishes feeding by hitting on top of the waterbody. The appearance of small bait fishes activates the sense of sight/vision of the predatory fishes, thereby attracting the predatory fishes. Further, the round circular pattern formed in the waterbody when used off-shore resembles the appearance of a bait ball. The term 'bait ball' refers to a large cluster of small fishes occurring in a tightly packed spherical formation about a common center. The formation of bait ball is a defensive measure adopted by small fishes when threatened by predatory fishes. The round circular pattern of water mimicking the appearance of the bait ball activates the sense of sight/vision of the predatory fishes thereby attracting the predatory fishes. The appearance of bait ball attracts predatory fishes from deep to feed on the bait fishes. The appearance of the bait ball leads the predatory fishes to enter into a feeding frenzy. The term 'feeding frenzy' refers to the emotion of the predatory fishes when they are overwhelmed by the amount of prey available. Feeding frenzy causes the predatory fishes to go wild, biting anything that moves, including each other or anything else within a biting range.

Further, the fish calling device the sprays the water into the waterbody from a particular height. The sprayer 102 is designed at a height 'l' from the base 112, and at a height 'h' from the float 108. Therefore, the water is sprayed from the sprayer 102 from the height 'l' when used in-shore. Further, the water is sprayed from the sprayer 102 from at least height 'h' when used off-shore. When water is sprayed from particular height through the sprayer 102, the water hitting the waterbody creates a noise. The noise mimics the sound of bait fishes (prey) escaping from the predatory fishes. Heavier the water sprayed from the sprayer 102, the noise will be more like the bait fish. The sound of the bait fishes along with the appearance leads the predatory fishes to enter into feeding frenzy.

Further, a scent bag (not shown in the figure) is attached to the sprayer 102. The scent bag is configured to disperse a scent to the water in the sprayer 102. The scent is attached to the sprayer 102 by suction. When the sprayer 102 sprays water, the scent is dispersed into the waterbody creating smell of a bait fish. The smell attracts the predatory fishes by activating the olfaction (smelling) sense of the predatory fishes.

The fish calling device comprises a pump 104 configured for pushing water into the sprayer 102. The pump 104 is designed to pump water from the waterbody and push the water into the sprayer 102. The pump 104 comprises a strainer (not shown in the figure) for filtering out dirt from the water pumped from the waterbody. The pump 104 is connected to the sprayer 102 using a pipe 106. The pump 104 is attached to one end of the pipe 106 and the sprayer 102 is attached to the other end of the pipe 106. The pump 104 pulls the water from the waterbody through the base 112. Further, the pump 104 pushes the water to the sprayer 102 through the pipe 106. The retainer ring 110 is attached at the center along the length of the pipe 106. The retainer ring 110 enables attachment and detachment of the float 108 to the fish calling device. Further, the fish calling device comprises a battery (not shown in the figure) for providing the power supply. The battery provides power required for the pump and the sprayer.

Therefore, the fishing calling device is used to attract predatory fishes by activating the senses of sight, hearing and smell. The fish calling device activates the senses by mimicking the appearance, characteristics and smell of a bait fish. The fish calling device sprays water into the waterbody where fishing is performed. The water is sprayed into the waterbody in a circular pattern mimicking the appearance of a bait ball. Further, the water sprayed hits on the waterbody creating the sound of bait fishes. Furthermore, the water sprayed disperse/dispense a scent in the waterbody having smell of a bait fish. The fish calling device is capable of being used both in off-shore and in-shore for fishing. The fish calling device floats on the waterbody by itself. The fish calling device floating on the water makes a good haven for bait fishes, thereby attracting more predatory fishes.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:
1. A fish calling device comprising:
a sprayer configured for spraying water to a waterbody for attracting predatory fishes during fishing/competition by mimicking sensory characteristics of bait fishes to activate the sensory characteristics of the predatory fishes, and wherein the sensory characteristics include an appearance, a sound and a smell, and wherein the sprayer comprises a nozzle configured for spraying the water into the waterbody, and wherein the sprayer is configured to rotate in one of a clockwise direction and a counter-clockwise direction while spraying water into the waterbody for creating a pattern;
a pump configured for pushing water to the sprayer;
a pipe connected to the pump and configured to transfer the water from the pump to the sprayer, and wherein the pump is connected to one end of the pipe and wherein the sprayer is connected to the other end of the pipe;
a float configured for enabling the sprayer, the pump, the pipe, a retainer ring, and a base to float on the waterbody when used off-shore, and wherein the float is removably attached to the main body;
the retainer ring configured for attaching the float to the pipe, and wherein the retainer ring is placed at a middle of the pipe along a length or longitudinal direction of the pipe; and the base configured for attaching the the sprayer, the pump, the pipe, the retainer ring, and the base to a dock, a boat or a shoreline when the fish calling device is used from in-shore, and wherein the pump is attached on top of the base.

2. The fish calling device as claimed in claim 1, wherein the sprayer is configured to spray water to the waterbody thereby creating a pattern to comply with an appearance of a large cluster of bait fishes.

3. The fish calling device as claimed in claim 1, wherein the sprayer is configured to spray water into the waterbody thereby creating a sound mimicking a sound of bait fishes escaping from the predatory fish.

4. The fish calling device as claimed in claim 1, wherein the pump is configured to push water to the sprayer by pumping water from the waterbody when used off shore.

5. The fish calling device as claimed in claim 1, wherein the pump is configured to push water to the sprayer by pumping water from a secondary water source when used in shore.

6. The fish calling device as claimed in claim 1, wherein the sprayer is configured to spray water in a circular pattern by moving the sprayer, the pump, the pipe, the retainer ring, and the base in back and forth directions or in a circle when used off-shore.

7. The fish calling device as claimed in claim 1, wherein the sprayer is configured to spray water in a semi-circular format when used in-shore.

8. The fish calling device as claimed in claim 1, wherein the sprayer is configured to spray water in a circular pattern to comply with bait fishes balling up to form a bait ball.

9. The fish calling device as claimed in claim 1, wherein the sprayer is configured to spray the water mimicking an appearance, sound and smell of the bait fishes for leading the predatory fishes to enter into a feeding frenzy.

10. The fish calling device as claimed in claim 1, wherein the float is configured to enable the sprayer, the pump, the pipe, the retainer ring, and the base to float by itself.

11. The fish calling device as claimed in claim 1, wherein the float is configured to enable the sprayer, the pump, the pipe, the retainer ring, and the base to draw predatory fishes from deep to feed on bait fishes.

* * * * *